United States Patent [19]

Philofsky et al.

[11] 3,999,157
[45] Dec. 21, 1976

[54] ELECTRICAL APPARATUS HAVING CONDUCTORS BANDED TOGETHER WITH FLEXIBLE BELTS

[75] Inventors: Harold M. Philofsky; Robert L. Kolek, both of Pittsburgh, Pa.

[73] Assignee: Westinghouse Electric Corporation, Pittsburgh, Pa.

[22] Filed: Jan. 15, 1975

[21] Appl. No.: 541,367

[52] U.S. Cl. .......................... 336/197; 174/138 E; 310/194; 310/260; 310/270; 310/271
[51] Int. Cl.² ........................................ H01F 17/00
[58] Field of Search .......... 310/194, 189, 217, 218, 310/51, 260, 270, 271; 336/197, 100, 60, 185, 196; 57/152, 140, 140 G; 174/120, 121, 138 E

[56] References Cited
UNITED STATES PATENTS

| 720,307 | 2/1903 | Wood | 310/271 |
|---|---|---|---|
| 2,400,008 | 5/1946 | Korte | 310/194 |
| 3,027,476 | 3/1962 | Coggeshall | 310/260 |
| 3,135,888 | 6/1964 | Coggeshall | 310/271 |
| 3,344,296 | 9/1967 | Coggeshall | 310/271 |
| 3,455,100 | 7/1969 | Sidles | 57/152 |
| 3,665,234 | 5/1972 | Bishop | 310/260 |

*Primary Examiner*—R. Skudy
*Attorney, Agent, or Firm*—C. L. McHale

[57] ABSTRACT

A plurality of conductors are surrounded by a continuous, flexible belt which is doubled over to provide loops at each end thereof. Non-metallic rods are disposed through the loops for providing surfaces to which a non-metallic buckle or strap is connected for securing the belt. The belt consists of a plurality of glass fiber cords which are surrounded by a cured elastomeric material. The cords are formed from glass fiber strands which are twisted sufficiently to provide the desired amount of belt strength and flexibility.

8 Claims, 10 Drawing Figures

ELECTRICAL APPARATUS HAVING CONDUCTORS BANDED TOGETHER WITH FLEXIBLE BELTS

BACKGROUND OF THE INVENTION

1. Field of the Invention

This invention relates, in general, to electrical apparatus and, more specifically, to arrangements for banding together groups of conductors in the end windings of turbine generators.

2. Description of the Prior Art

Electrical conductors which form the coils of electrical apparatus windings must be sufficiently secured to prevent movement of the conductors and damage to the insulation therearound. In large rotating electromechanical apparatus, the large mechanical forces to which the conductors are subjected makes it a difficult task to properly secure the conductors. The conductors of the stator end windings in large turbine generators are typical of conductors where difficulty has been experienced in the prior art in satisfactorily and economically securing the conductors. Ideally, the conductor securing arrangement should firmly secure the conductor throughout the life of the machine and should offer convenient and effective repair techniques if alteration or replacement of a conductor is necessary.

The end winding conductors of turbine generators have been secured by several different arrangements according to the prior art. One arrangement involves the tying together of adjacent conductors by wrapping a glass roping around the two conductors. This wrapping or tie arrangement is repeated throughout the entire winding, thus every conductor is tied directly to an adjacent conductor at least at one position along the conductor. Typically, the two-conductor ties are staggered throughout the end turns of the winding to provide several ties to each conductor. As with other prior art arrangements and the new arrangement disclosed herein, suitable spacers are usually positioned between the conductors and are held in place mainly by the force between the conductors created by the wrapping arrangement.

While the wrapping of adjacent conductors pairs with glass roping has been satisfactory for smaller apparatus, such an arrangement is not completely desirable for large apparatus wherein the conductors are subjected to relatively large forces. Due to the multiplicity of ties, the securing of conductors according to this prior art arrangement is very laborious and time consuming. In addition, the amount of force which holds the conductors together is dependent upon the tension in the tie, which is highly dependent upon the ability and consistency of the person making tie. With such an arrangement, it is difficult to assure that all of the ties will have enough tension to properly restrain the conductors. Also, since the roping is wound around the conductors several times, there is not any convenient way to re-tighten the ties should it later be desirable to do so.

Another useful prior art arrangement for securing the end winding conductors of turbine generators is disclosed in U.S. Pat. No. 3,135,888. According to that patent, a two-piece strap assembly consisting of cured-in-place glass fiber roving is used to secure several conductors together. In the completed apparatus, the lower portion of the strap assembly is rigid and conforms to the shape in which it was cured. Due to the rigid characteristics of the lower portion of this prior art strap arrangement, certain properties of the complete strap assembly are inherent. Since the desired tension is put into the lower strap before it was cured into a rigid structure, it is not feasible to re-tension the rigid strap which extends around the corners of the conductors without putting undesirable stresses in the cured material and in the strap where it blends around the corners of the conductors. With this restriction, such strap assemblies are not very suitable for conductor replacement or re-tightening any time after final assembly. Therefore, it is also desirable, and it is another object of this invention, to provide an arrangement for connecting together end winding conductors which is suitably constructed for conductor replacement and re-tensioning after the apparatus has been in operation.

End winding conductors are separated by suitable spacer blocks which are placed in compression by the strap assembly around the conductors. Due to the constant compressive forces, the minute mechanical movements of the conductors, the operating temperature of the apparatus, and other factors, some of the spacer blocks have been known to become loose after a period of operation. Although an initial tensile force is developed in the rigid strap assembly of the prior art, the compressive forces on the spacer blocks are quickly reduced if they become slightly smaller, since the elongation of the rigid belt is small. Thus, with a rigid strap constructed according to the prior art, small decreases in spacer size produce relatively large decreases in the compressive force holding the conductors and spacer blocks together. Therefore, it is desirable, and it is another object of this invention, to provide a conductor restraining arrangement wherein the force holding the conductors and spacer blocks together is not changed appreciably when the spacer blocks decrease in size during the life of the apparatus.

The requirement that the lower strap be cured after it has been placed in the apparatus and tensioned presents some inconvenient construction steps. Since the lower strap is substantially non-exposed, local heating of the strap to produce curing is a difficult procedure. Heating of the complete apparatus is also relatively difficult when the size of such machines is taken into consideration. The use of a material which cures at room temperature eliminates the heating inconveniences, but the shelf life of the material is short and the application thereof would have to adhere to a definite time schedule. Therefore, it is also desirable, and it is still another object of this invention, to provide an arrangement for connecting together end winding conductors which does not require that the lower strap or belt be cured after it has been placed into the apparatus.

SUMMARY OF THE INVENTION

There is disclosed herein a new and useful arrangement for securing conductors to each other. The arrangement includes a continuous belt which is doubled over on itself and disposed around a group of conductors. A buckle or strap arrangement is used to place the belt under tension and force the conductors together. Rods or pins constructed of a suitable non-metallic material are inserted through the loops at each end of the doubled belt to provide surfaces which are used to connect the tension maintaining strap or buckle arrangement to the belt.

The belt is constructed from a continuous array of glass fiber cords which are sandwiched between a fully cured elastomeric material. Each cord consists of a plurality of glass fiber strands which are individually twisted around their own longitudinal axis and which are also collectively twisted around the axis of the cord. The twisting permits better flexibility and a more uniform stress transfer within the belt and the belt reinforcement.

Since the belt consists of fully cured materials, problems associated with short shelf life and heat curing after assembly are eliminated. Due to the flexibility of the belt, re-use and re-tensioning thereof can be achieved. In addition, since the belt is elastic, a considerable amount of tension still exists in the belt if the conductors become closer together due to compressed spacers.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
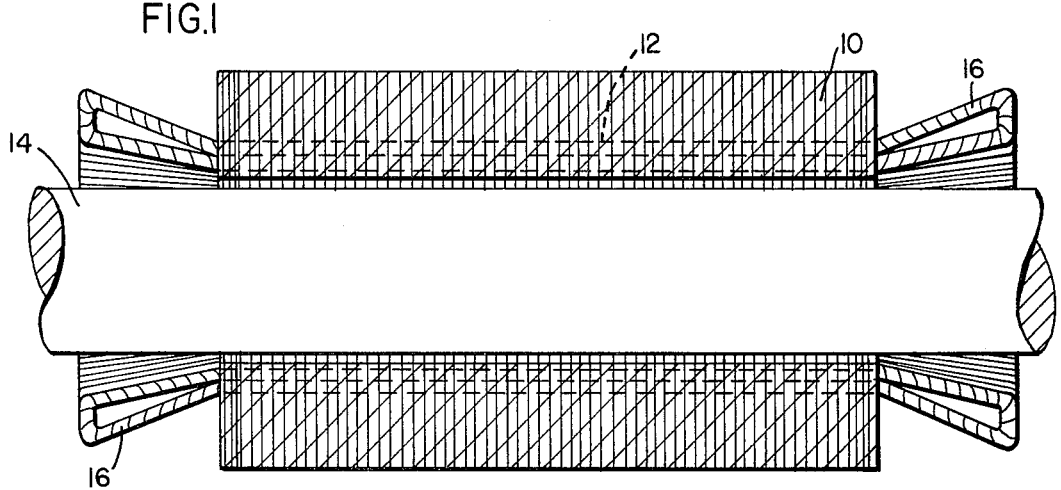
FIG. 1 is a general view of the turbine generator having conductors extending from the stator core.

Throughout the following description, similar reference characters refer to similar elements or members in in all of the figures of the drawing.

Referring now to the drawing, and to FIG. 1 in particular, there is shown a general view of a turbine generator which includes the stator core assembly 10, the stator winding assembly 12, and the rotor assembly 14. The rotor assembly 14 normally includes a combination of laminations of a magnetic material and coils which form the field winding of the apparatus. The stator winding assembly 12 includes the conductors 16 which extend from the core assembly 10 to provide an electrical path for making interconnections between the turns of the stator winding assembly 12. The conductors 16 are also known in the art as coils of the stator end windings. The conductors 16 extend completely around the rotor assembly 14 and are connected together by appropriate connections depending upon the type of the apparatus. Various supporting arrangements, which are not illustrated in FIG. 1, are used to secure the conductors 16 to the stator core assembly 10 and to each other.

Figure 2:
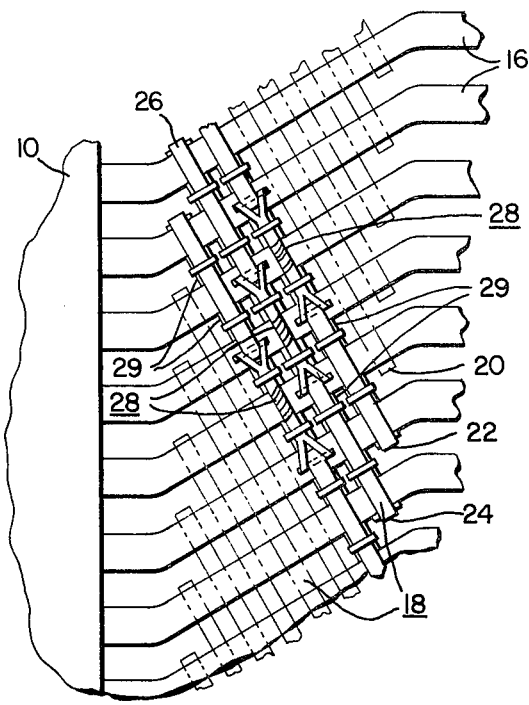
FIG. 2 is a partial view of an arrangement for securing winding conductors according to an embodiment of this invention.

FIG. 2 illustrates an arrangement of this invention for connecting together a plurality of conductors 16 which extend from the turbine core assembly 10. A plurality of securing members 18, some of which are shown in phantom in FIG. 2, extend around at least two of the conductors 16. The positions of the members 18 are staggered throughout the conductor region in order that each conductor 16 is secured to another conductor by at least one securing member 18. The staggered arrangement is illustrated by the placement of the conductor ends adjacent to different electrical conductors, such as the ends 20, 22 and 24. Although FIG. 2 illustrates the conductors 16 and the securing members 18 in a plan view, it is pointed out that the actual physical construction of such members is such that the surface of the conductors across which the securing member is positioned is arc shaped.

The securing member 18 includes the flexible belt 26 and the buckle or strap 28 which is used to connect the ends of the belt 26 together. Spacers, such as the spacer 29, are positioned between the conductors 16 to provide adequate separation. The securing member 18 is disposed around the conductors 16 and is under the influence of a tensile stress which ultimately pulls the conductors within the securing member 18 together.

Figure 3:
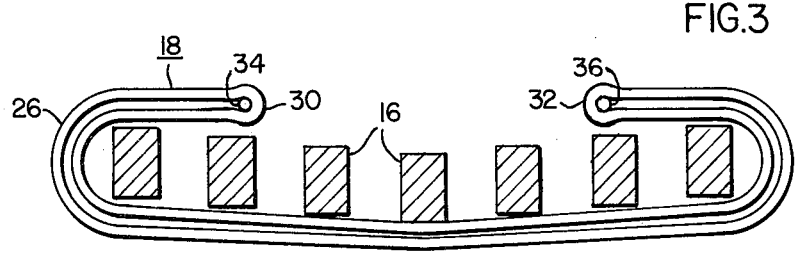
FIG. 3 is a view illustrating a step in the construction of the securing assembly shown in FIG. 2.

FIG. 3 is a view illustrating a step in the placement of the securing member 18 around the conductors 16. The strap 28 and the spacers 29 are not illustrated in FIG. 3. The belt 26 consists of a fully cured elastomeric material which is reinforced with glass fiber cords. The belt is continuous in that the cords run completely around the surface of the belt without any splice therebetween. The belt 26 is doubled over on itself as shown in FIG. 3 to provide the ends 30 and 32. The loops at the ends 30 and 32 contain non-metallic rods 34 and 36 which are constructed of a suitable material, such as glass reinforced epoxy. The conductors 16 are positioned on the belt 26 after it has been placed in the apparatus. After the conductors are in place, the doubled belt 26 is pulled around the end conductors of the group of conductors to position the rods 34 and 36 for connection to each other.

Figure 4:
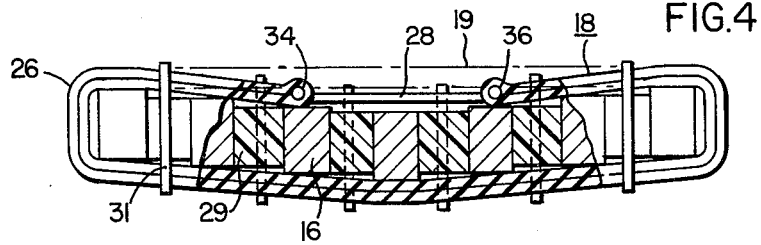
FIG. 4 is a view illustrating the final position of the securing assembly around a plurality of conductors and spacers.

FIG. 4 illustrates the securing member 18 after it has been tensioned and strapped into place. FIG. 4 also illustrates, in phantom, the position 19 of the securing member 18 before it is strapped in place around the conductor assembly. Initially, the rods 34 and 36 are pulled together by a suitable construction fixture to impart a predetermined amount of tension in the flexible belt 26. While the fixture is still connected to the rods 34 and 36, a suitable strap 28, as shown in this specific embodiment, is connected to the rods 34 and 36 to retain the tension in the belt 26 after the fixture is removed. At this point in the construction of the securing member 18, the upper portion of the securing member 18 occupies the position 19 indicated in phantom in FIG. 4. A suitable connecting strap 28 may consist of a wrapping of glass fiber roping between the rods 34 and 36 and a suitable resin coating applied thereto.

After the securing member 18 has been tensioned and secured by the strap 28, it is pulled down against the conductors 16 by the straps 31 which extend around the spacers 29. The number of straps used to hold the securing member 18 against the conductors 16 may be varied from that shown in FIG. 4 without departing from the invention. A suitable material for the straps 31 may include a resin impregnated glass roping similar to that used to construct the strap 28. When the securing member is pulled down against the conductors 16, an additional amount of tension is placed in the flexible belt 26. Thus, the original tension placed in the belt 26 when it is in the position 19 shown in phantom is slightly less than that desired in the belt in the final configuration.

Figure 5:
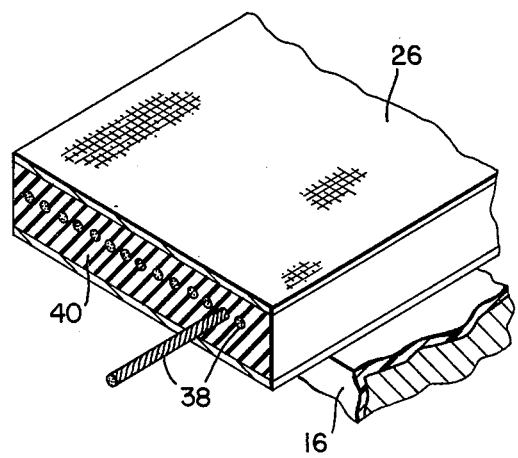
FIG. 5 is a view illustrating the construction of the belt used in FIG. 4.

FIG. 5 illustrates the construction of the belt 26 and the orientation of its component members with respect to the conductor 16. Although the belt 26 is a continuous loop which is doubled over to provide a flexible member having two ends, only a single portion of the belt is illustrated in detail in FIG. 5 rather than illustrating both of the doubled portions. As shown in FIG. 5, the belt 26 includes a plurality of glass fiber cords 38 which are surrounded by an elastomeric material 40. A suitable backing material, such as cotton duck, is positioned on both sides of the belt to increase the ability of the belt to withstand surface tearing.

The belt 26 may be constructed by placing a semi-cured elastomeric material around a mandrel and overwinding the elastomeric material with the glass fiber cords. The number of cords in a cross-section of the belt is determined by the number of revolutions made by the mandrel in winding the glass fiber cords on the elastomeric material. The number of cords in a cross-sectional area of the belt is selected to provide the desired tensile strength for the belt 26. The assembly is covered with a suitable overlay or jacket and then pressure cured by heat or hydraulic pressure in a suitable mold.

A suitable belt may be constructed by using neoprene rubber stock, which is approximately 62 mils thick, G75 5/4, 2.5S rubber impregnated fiber glass cords, and a cotton duck overlay or jacket. Another example of suitable materials includes ethylene propylene rubber stock, approximately 125 mils thick, G75 5/5/3, 1.0S rubber impregnated fiber glass cords, and a nylon duck overlay or jacket. A third example of suitable materials consists of butyl rubber stock, approximately 100 mils thick, G75 7/0, 1.5S rubber impregnated fiber glass cords, and a dacron duck overlay or jacket. While the above examples of material combinations are illustrative of material which may be used to construct suitable belts, it is emphasized that other material combinations may be used for the belt 26 without departing from the spirit of the invention.

Figure 6:
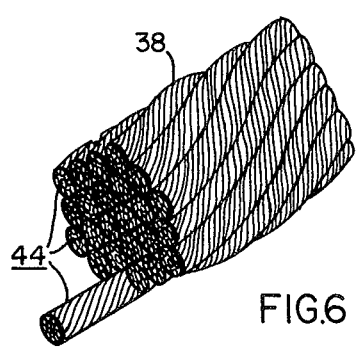
FIG. 6 is a view illustrating the construction of a cord for use in the belt shown in FIG. 5.

FIG. 6 is an enlarged view of a cord 38 shown in FIG. 5. The cord 38 includes a plurality of strands 44. The strands 44 are each individually twisted about its own longitudinal axis. In addition, the entire cord comprising all of the strands 44 is twisted about its longitudinal axis. The double twisting technique illustrated herein provides a glass fiber cord which suitably provides the strength and flexibility requirements needed to permit the belt 26 to satisfactorily perform as a securing member for a turbine generator. Glass fiber strands arranged without any twisting do not provide the flexibility and durability desired for the belt 26.

Figure 7:
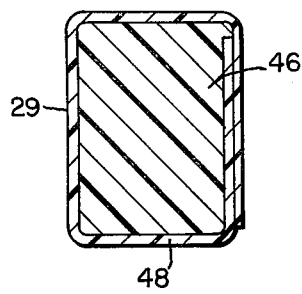
FIG. 7 is a view of a spacer used to separate the conductors.

FIG. 7 is a cross-sectional view of a spacer 29 which is used to separate the conductors 16. The spacer 29 includes a solid block 46 which is wrapped with a curable material 48. The material comprising the block 46 may include a fibrous cloth, resin impregnated material, such as Micarta. The material 49 may be comprised of Dacron cloth which is impregnated with a curable resin. When the spacer 29 is inserted between the conductors 16 and placed under compression by the tension in the belt 26, any irregularities in the surface of the conductor 16 are conformed to by the material 48 of the block 29. Thus, while most of the block 29 is rigid before being placed into the apparatus during construction and before curing of the apparatus, the spacer 29 is suitably constructed to conform to the shape of the conductors 16 after the apparatus has been fully cured when the belts 26 are in place.

Figure 8:
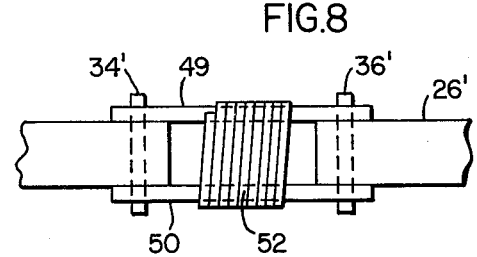
FIG. 8 is a view illustrating a connecting arrangement for securing together the ends of the belt.

FIG. 8 illustrates an arrangement which may be used to connect the ends of the belt 26' together. The rods 34' and 36' are placed through openings in the rigid plates 49 and 50 which are constructed of a non-metallic, resin impregnated fibrous cloth material, such as Micarta. The non-metallic plates 49 and 50 are secured together by wrapping a glass banding 52 therearound and coating the banding with a suitable adhesive or resin.

Figure 9:
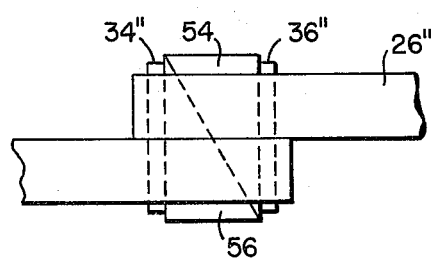
FIGS. 9 and 10 are views illustrating another connecting arrangement for securing together the ends of the belt.
Figure 10:
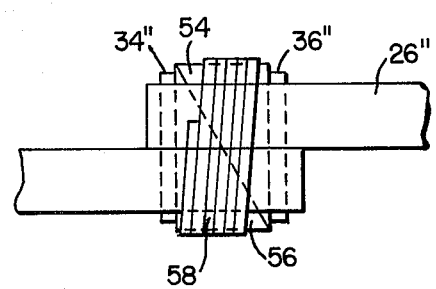

FIGS. 9 and 10 indicate another arrangement which may be used to connect together the ends of the belt 26''. The ends of the belt 26'' overlap each other and the rods 34'' and 36'' extend into the loops at both ends of the belt 26''. Wedges 54 and 56, which may also be constructed of Micarta, are positioned between the rods 34'' and 36''. Pushing the wedges closer together forces the rods 34'' and 36'' farther apart and increases the tension in the belt 26''. As shown in FIG. 10, a suitable strapping material 58 may be wrapped around the wedges 54 and 56 to maintain their relative positions after the proper amount of tension has been established in the belt 26''.

The specific arrangement of elements described herein allows for a convenient and economical securing of the conductors which extend from the stator coils of large turbine generators. Since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

We claim as our invention:

1. Electrical apparatus comprising:
    a plurality of substantially parallel winding conductors;
    a resilient and flexible member reinforced with non-metallic cords of twisted strands, said flexible member having two ends and being disposed around a portion of at least two of said conductors; and,
    means for connecting the ends of said flexible member together to develop a tensile stress in the resilient and flexible member which forces said conductors together, said means for connecting the ends together comprising a rigid, non-metallic member constructed of a plurality of resin impregnated layers of a fibrous cloth material, said rigid member having at least two openings therein, and non-metallic rods positioned through loops at the end of the flexible member, with the rods extending into the openings in the rigid member.

2. The electric apparatus as defined in claim 1, wherein said loops are disposed in overlapping relation with each other, and including a plurality of wedge-shaped members positioned between the non-metallic rods to force said rods apart and produce tension in the flexible member.

3. The electrical apparatus as defined in claim 1, wherein the cords of said flexible member are surrounded by an elastomeric material.

4. The electrical apparatus as defined in claim 3 wherein said elastomeric material comprises a rubber material.

5. The electrical apparatus as defined in claim 1 wherein said cords comprise a plurality of glass fiber strands.

6. The electrical apparatus as defined in claim 5 wherein said strands are individually twisted around their longitudinal axis.

7. The electrical apparatus as defined in claim 1 wherein said flexible member comprises a continuous belt folded over to provide loops at each end.

8. The electrical apparatus as defined in claim 1 wherein said cords in said flexible member are oriented substantially parallel to the longest dimension of said flexible member.

* * * * *